US007454584B2

(12) United States Patent
Mitsuoka et al.

(10) Patent No.: US 7,454,584 B2
(45) Date of Patent: Nov. 18, 2008

(54) STORAGE CONTROL SYSTEM AND STORAGE CONTROLLER

(75) Inventors: Yoshio Mitsuoka, Odawara (JP); Hiroshi Kuwabara, Ninomiya (JP)

(73) Assignee: Hitachi, Ltd., Tokyo (JP)

(*) Notice: Subject to any disclaimer, the term of this patent is extended or adjusted under 35 U.S.C. 154(b) by 255 days.

(21) Appl. No.: 11/265,161

(22) Filed: Nov. 3, 2005

(65) Prior Publication Data

US 2007/0055838 A1 Mar. 8, 2007

(30) Foreign Application Priority Data

Sep. 2, 2005 (JP) ............................ 2005-255488

(51) Int. Cl.
*G06F 12/00* (2006.01)
*G06F 13/00* (2006.01)
*G06F 13/28* (2006.01)

(52) U.S. Cl. .......................... 711/163; 709/217; 707/9; 707/200

(58) Field of Classification Search ................. 709/203; 711/152, 164, 114
See application file for complete search history.

(56) References Cited

U.S. PATENT DOCUMENTS 6,684,209 B1 * 1/2004 Ito et al. ........................ 707/9
7,010,660 B2 * 3/2006 Mimatsu et al. ............. 711/170
2004/0122911 A1 * 6/2004 Chong et al. ................ 709/217
2005/0076066 A1 * 4/2005 Stakutis et al. .............. 707/200

* cited by examiner

*Primary Examiner*—Reginald G Bragdon
*Assistant Examiner*—Baboucarr Faal
(74) *Attorney, Agent, or Firm*—Mattingly, Stanger, Malur & Brundidge, P.C.

(57) ABSTRACT

A storage control system that makes it possible to integrate the setting of access between initiators and targets connected to a communication network and the setting of LUN security for the targets. The storage control system has: a host computer having one or more initiators; a storage controller having one or more targets and storage areas, and also having a security property-for defining access relationships between-the targets and the storage areas; and a server having a memory for storing correspondence relationships between the initiators and the targets, and a function for notifying the host computer and a storage controller of the correspondence relationships information. The host computer, the storage controller and the server are connected to each other via a communication network, and the storage controller sets, based on notification information from the server, the security property in such a manner that an initiator can access a specified storage area via a target, the initiator and the target having been notified of the notification information.

12 Claims, 13 Drawing Sheets

START
1000 INITIATOR/TARGET ESTABLISHES TCP/IP CONNECTION TO ISNS SERVER
1002 INITIATOR/TARGET IS REGISTERED AT ISNS SERVER
1004 SET DISCOVERY DOMAIN (ADMINISTRATOR)
INITIATOR AAAA → DOMAIN 001 ← TARGET BBBBB
→ DOMAIN 002 ← TARGET CCCCC
1006 DISCOVERY DOMAIN CHANGE NOTIFICATION [ISNS SERVER ESTABLISHES TCP/IP CONNECTION]
1008 INITIATOR/TARGET ESTABLISHES CONNECTION TO ISNS SERVER
1010 INITIATOR/TARGET REQUESTS DISCOVERY DOMAIN INFORMATION [ISNS SERVER SENDS DISCOVERY DOMAIN INFORMATION]
1012 REGISTER ENTRY DD# IN DISCOVERY DOMAIN LIST TABLE
1014 REGISTER ENTRY DD# IN TARGET LIST TABLE
1016 REGISTER DOMAIN BIT MAP (DD#) IN INITIATOR LIST TABLE
1018 ENABLE HOST GROUP BIT MAP IN INITIATOR LIST TABLE
END

FIG.4

DEVICE LIST TABLE

| DEVICE NAME | TYPE | CONTROL | IP ADDRESS/IP PORT | SCN | ESI | DOMAIN BIT MAP |
|---|---|---|---|---|---|---|
| AAAAA | INITIATOR | MANAGEMENT | 192.168.100.99/—- | Yes | 900 | 011000000000 ······· 00 |
| BBBBB | TARGET | MANAGEMENT | 192.168.100.200/3260 | Yes | 900 | 010000000000 ······· 00 |
| CCCCC | TARGET | MANAGEMENT | 192.168.100.100/3260 | Yes | 900 | 001000000000 ······· 00 |
| DDDDD | INITIATOR | MANAGEMENT | 192.168.100.103/-— | Yes | 900 | 100000000000 ······· 00 |
| EEEEE | INITIATOR | MANAGEMENT | 192.168.100.107/—— | Yes | 900 | 000000000000 ······· 10 |
| JJJJJ | TARGET | MANAGEMENT | 192.168.100.191/3260 | Yes | 900 | 000000000000 ······· 10 |
| KKKKK | TARGET | MANAGEMENT | 192.168.100.192/3260 | Yes | 900 | 000000000100 ······· 00 |
| . . . | | | | | | |
| XXXXX | TARGET | MANAGEMENT | 192.168.100.198/3260 | Yes | 900 | 000000000000 ······· 00 |
| ZZZZZ | TARGET | MANAGEMENT | 192.168.100.199/3260 | Yes | 900 | 000000000000 ······· 00 |

FIG.5

DISCOVERY DOMAIN

| DOMAIN NAME | MEMBERS |
| --- | --- |
| DOMAIN X | INITIATOR A<br>TARGET C |
| DOMAIN Y | INITIATOR B<br>TARGET D |

TARGET NETWORK INFORMATION TABLE

| PORT | IP ADDRESS/IP PORT | ISNS SERVER ADDRESS |
|---|---|---|
| 1A | 192.168.100.200/3260 | 192.168.100.254 |
| 1B | 192.168.100.201/3260 | 192.168.100.254 |
| ... | | |
| 2A | | |
| 2B | | |

(4)

ACCESS LIST TABLE

| HG# | LUN | CU:LDEV |
|---|---|---|
| 01 | 00 | 00:00 |
| | 01 | 00:01 |
| 02 | 00 | 01:00 |
| | 01 | 01:01 |

(2)

TARGET LIST TABLE

| HG# | TARGET NAME | PORT | DD |
|---|---|---|---|
| 00 | | | |
| 01 | BBBBB | 1A | 01 |
| 02 | CCCCC | 1A | 02 |
| ... | ... | | |
| FF | ZZZZZ | 1B | "00" |

(6)

DISCOVERY DOMAIN LIST TABLE

| ENTRY | DOMAIN NAME |
|---|---|
| 00 | ------- (NOT SET YET) |
| 01 | DOMAIN 001 |
| 02 | DOMAIN 002 |
| ... | ... |
| FF | DOMAIN XYZ |

(3)

INITIATOR LIST TABLE

| INITIATOR NAME | HOST GROUP BIT MAP | DOMAIN BIT MAP |
|---|---|---|
| AAAAA | 011000000000 ······ 00 | 010000000000 ······ 00 |
| DDDDD | 000000000000 ······ 00 | 000000000000 ······ 00 |
| EEEEE | 000000000000 ······ 00 | 000000000000 ······ 00 |
| YYYYY | 000000000000 ······ 00 | 000000000000 ······ 00 |

(5)

INITIATOR NAME NETWORK CONVERSION

| INITIATOR NAME | IP ADDRESS/IP PORT | HG# |
|---|---|---|
| AAAAA | 192.168.100.1/10240 | 01 |
| AAAAA | 192.168.100.1/10241 | 02 |
| DDDDD | --/-- | .. |
| EEEEE | --/-- | .. |
| ... | | |
| YYYYY | --/-- | .. |

DISCOVERY DOMAIN INFORMATION FOR TARGET BBBBB

| DOMAIN NAME | iSCSI NAME | TYPE | IP ADDRESS/TCP PORT |
|---|---|---|---|
| DOMAIN 001 | BBBBB<br>AAAAA | TARGET<br>INITIATOR | 192.168.100.200/3260<br>192.168.100.103/---- |

(2)

DISCOVERY DOMAIN INFORMATION FOR TARGET CCCCC

| DOMAIN NAME | iSCSI NAME | TYPE | IP ADDRESS/TCP PORT |
|---|---|---|---|
| DOMAIN 002 | CCCCC<br>AAAAA | TARGET<br>INITIATOR | 192.168.100.200/3260<br>192.168.100.103/---- |

FIG.12

TARGET NETWORK INFORMATION TABLE

| PORT | IPADDRESS/IP PORT | iSNS SERVER ADDRESS | SERVER | Listen |
|---|---|---|---|---|
| 1A | 192.168.100.200/3260 | 192.168.100.254 | Disable | — |
| 1B | 192.168.100.201/3260 | 192.168.100.254 | Disable | — |
| ... | | | | |
| 2A | 192.168.100.220/3260 | 192.168.100.220 | Enable | 3205 |
| 2B | 192.168.100.230/3260 | 192.168.100.220 | Disable | — |

FIG.13

DISCOVERY DOMAIN LIST TABLE

| ENTRY | DOMAIN NAME |
|---|---|
| 00 | -------- (NOT SET YET) |
| 01 | DOMAIN 001 |
| 02 | DOMAIN 002 |
| .. | ... |
| 09 | DOMAIN 010 |
| .. | ... |
| FE | DOMAIN VWX |
| FF | DOMAIN XYZ |

TARGET LIST TABLE

| HG# | TARGET NAME | PORT | DD |
|---|---|---|---|
| 00 | JJJJ | -- | FE |
| 01 | BBBBB | 1A | 01 |
| 02 | CCCCC | 1A | 02 |
| 05 | KKKKK | 2B | 09 |
| ... | ... | | |
| 00 | XXXXX | -- | 00(NOT SET YET) |
| 00 | ZZZZZ | -- | 00(NOT SET YET) |

ACCESS LIST TABLE

| HG# | LUN | CU:LDEV |
|---|---|---|
| 00 | 00 | FF:FF(INDICATE EXTERNAL DEV) |
| 01 | 00 | 00:00 |
| | 01 | 00:01 |
| 02 | 00 | 01:00 |
| | 01 | 01:01 |
| 05 | 00 | FF:FF(INDICATE EXTERNAL DEV) |
| 06 | 00 | 11:00 |

INITIATOR LIST TABLE

| INITIATOR NAME | HOST GROUP BIT MAP | DOMAIN BIT MAP |
|---|---|---|
| AAAAA | 011000000000 ······ 00 | 010000000000 ······ 00 |
| DDDDD | 000000000000 ······ 00 | 100000000000 ······ 00 |
| EEEEE | 000000000000 ······ 00 | 000000000000 ······ 00 |
| ... | | |
| ... | | |
| YYYYY | 000000000000 ······ 00 | 000000000000 ······ 00 |

DEVICE LIST TABLE

| DEVICE NAME | TYPE | CONTROL | IP ADDRESS/ TCP PORT # | SCN | ESI | DOMAIN BIT MAP |
|---|---|---|---|---|---|---|
| AAAAA | INITIATOR | MANAGEMENT | 192.168.100.99/--- | YES | 900 SECONDS | 011000000000 ······ 00 |
| BBBBB | TARGET | MANAGEMENT | 192.168.100.200/3260 | YES | 900 SECONDS | 010000000000 ······ 00 |
| CCCCC | INITIATOR | MANAGEMENT | 192.168.100.200/3260 | YES | 900 SECONDS | 001000000000 ······ 00 |
| DDDDD | INITIATOR | MANAGEMENT | 192.168.100.103/--- | YES | 900 SECONDS | 100000000000 ······ 00 |
| EEEEE | TARGET | MANAGEMENT | 192.168.100.107/--- | YES | 900 SECONDS | 000000000000 ······ 10 |
| JJJJJ | TARGET | MANAGEMENT | 192.168.100.191/3260 | YES | 900 SECONDS | 000000000000 ······ 10 |
| KKKKK | TARGET | MANAGEMENT | 192.168.100.192/3260 | YES | 900 SECONDS | 000000000100 ······ 00 |
| ... | | | | | | |
| XXXXX | TARGET | MANAGEMENT | 192.168.100.198/3260 | YES | 900 SECONDS | 000000000000 ······ 00 |
| ZZZZZ | TARGET | MANAGEMENT | 192.168.100.199./3260 | YES | 900 SECONDS | 000000000000 ······ 00 |

STORAGE CONTROL SYSTEM AND STORAGE CONTROLLER

CROSS REFERENCES TO RELATED APPLICATIONS

This application relates to and claims priority from Japanese Patent Application No. 2005-255488, filed on Sep. 2, 2005, the entire disclosure of which is incorporated herein by reference.

BACKGROUND OF THE INVENTION

The present invention relates to a storage control system, where storage controllers and host computers are connected via a communication network, for controlling access between targets in the storage controllers and initiators in the host computers. The present invention also relates to a storage controller used in this storage control system.

Storage area networks (SANs), where storage controllers and host computers, which are front-end apparatuses relative to the storage controllers, are connected to each other via a Fibre Channel, are well known. Lately, an IP-SAN, which constructs a SAN using an IP network instead of Fibre Channel, has been proposed in order to achieve SAN objectives such as long distance connection. An IP-SAN enables communication using the iSCSI (Internet SCSI) as a communication protocol.

In IP-SANs, a storage controller connected to a communication network is sometimes accessed from an indefinite number of nodes that are connected to the same network as well as different networks. Therefore, enhancing security by controlling access between initiators, units issuing I/O commands; and targets, units receiving the I/O commands on the network is an object that should be achieved.

One example that achieves the above object is disclosed in Japanese Patent Laid-Open (Kokai) Publication No. 2002-63063. This publication discloses a storage area network management system. In the management apparatuses are connected via a switch, has an integrated management mechanism for performing integrated control of the storage area network. The integrated management mechanism, having information on access paths between the host computers and the storage apparatuses, notifies storage area network management mechanisms in the host computers of management information for the storage apparatuses based on the access path information. It also notifies an area setting mechanism in the switch of area information and notifies storage management mechanisms in the storage apparatuses of access control information for the host computers.

Meanwhile, Japanese Patent Laid-Open (Kokai) Publication No. 2001-265655 discloses a storage sub system for realizing a LUN security function, which is to prevent unauthorized accesses by limiting accessible logical units (LUN) for each host computer. The storage sub system has: one or more storage apparatuses in which one storage area corresponds to one or more logical units; a storage controller for controlling data reading and writing from and to the storage apparatuses: a management table for managing the logical units: and a memory for storing the management table. The management table includes: information for identifying the host computers: identification numbers for specifying logical units that the host computers are allowed to access; and virtual identification numbers that correspond to the logical unit identification numbers and correspondence relationships therebetween. The storage sub system determines whether to permit or deny host computer access by referring to the management table, especially the information for identifying the host computers.

In a communication network using iSCSI as a communication protocol, host computers (initiators) are identified by iSCSI names in order to realize LUN security. Meanwhile, in storage controllers, targets are created via a user interface (for example, a GUI) on a management console. The targets are also assigned iSCSI names. The storage controllers register, in memory, the iSCSI names of initiators that are allowed to access the targets and assign accessible logical units to the targets.

Incidentally, in an IP-SAN system using the iSCSI protocol, host computers and storage controllers do not have means for finding ("discovery") connection destinations. Moreover, they do not have a function for notifying an indefinite number of devices on the network of iSCSI names.

If the host computers (initiators) know the IP addresses and TCP port numbers of the storage controllers (targets), they can obtain the iSCSI names of the targets. However, the iSCSI protocol does not provide a function for enabling the storage controllers (targets) to obtain the iSCSI names of the initiators. Accordingly, a storage controller administrator needs to set iSCSI name(s), set in host computer(s), in the storage controller. An iSCSI name consists of 223 letters at the maximum; therefore, manual setting of an iSCSI name may result in problems such as input mistakes.

One solution for the problem is to use an iSNS server service. An iSNS server has a function for classifying iSCSI initiators and iSCSI targets into groups called discovery domains, and provides the service of delivering the classification information to the initiators and the targets. With the iSNS server service, the initiators are informed of accessible targets. In order to realize this service, the iSCSI initiators and the iSCSI targets are registered as iSNS clients at the iSNS server. Based on the information registered by the clients, an iSNS server administrator creates discovery domains and registers the initiators and targets at the iSNS server while making groups with initiators and targets he/she intends to combine. Accordingly, an initiator is allowed to access an intended target based on the information from the iSNS server even if it is not informed of the IP address and the TCP port number of the intended target.

However, although setting of access relationships between the initiators and targets is easily performed by the iSNS server service, a storage controller administrator still has to set the correspondence relationships between the targets and initiators, the LUN security being set for both, separately from setting the correspondence relationships at the iSNS server. Consequently, if there is a time lag between setting at the iSNS server and setting of the LUN security in the storage controller, access settings in the iSNS server and that in the storage controller do not match.

Thereupon, it is an object of the present invention to provide a storage control system that can solve the problem by integrating the setting of access between initiators and targets connected to a communication network and the setting of LUN security for the targets. Another object of the present invention is to provide a storage control system which enables the reflection of the access settings in the iSNS server in the LUN security settings in a storage controller. Yet another object of the present invention is to provide a storage control system that can set, in the targets, identification information for the initiators without fail. Still another object of the present invention is to provide a storage controller for that storage control system.

SUMMARY OF THE INVENTION

In order to achieve the above objects, the present invention is characterized in that, based on discovery domain information notified from the iSNS server to the initiators and targets, a main processor in a storage controller sets LUN security (including original setting and updating) and when the discovery domain information is set at the iSNS server, initiator registration for LUN security is automatically set. Therefore, according to the present invention, it is possible to prevent an administrator's input mistakes when setting LUN security, and also to prevent inconsistencies between access settings at the iSNS server and access settings at the storage controller, which may be caused by a time lag between setting of the discovery domain information at the iSNS server and setting of the LUN security at the storage controller.

One aspect of the present invention is a storage control system having: a host computer having one or more initiators; a storage controller having one or more targets and storage areas, and also having a security property for defining access relationships between the targets and the storage areas; and a server having a memory for storing correspondence relationships between the initiators and the targets, and a function for notifying the host computer and a storage controller of the correspondence relationships information. In the storage control system, the host computer, the storage controller and the server are connected to each other via a communication network, and the storage controller sets, based on notification information from the server, the security property in such a manner that an initiator can access a specified storage area via a target, the initiator and the target having been notified of the notification information.

Another aspect of the present invention is a storage control system, in which a storage controller, a host computer, and a server, having a first memory defining correspondence relationships between one or more targets in the storage controller and one or more initiators in the host computer, are connected each other via a communication network, for controlling accesses between the initiators and the targets. The storage controller has: a port for receiving access from the host computer; a processor for processing information output from the port; a data storage apparatus for storing write data received from the host computer and/or read data transmitted to the host computer; and a second memory for storing a LUN security property that defines correspondence relationships between the targets and one or more logical units in the data storage apparatus; and an access management list that defines correspondence relationships between the initiators and the targets. The processor sets the access management list by referring to the correspondence relationships stored in the first memory.

Yet another aspect of the present invention is a storage controller connected via a communication network to a host computer having one or more initiators and to a sever having a memory for storing correspondence relationships between initiators and targets, and a function for notifying the host computer and the storage controller of the correspondence relationships. The storage controller has one or more targets, storage areas, and a security property that defines access relationships between the targets and the storage areas. The security property is set, based on notification information from the server, in such a manner that an initiator can access a specified storage area via a target, the initiator and the target having been notified of the notification information.

As explained, the present invention provides a storage control system and a storage controller that enables the prevention of administrator input mistakes when setting LUN security and also the prevention of inconsistencies between access settings at the iSNS server and access settings at the storage controller, which may be caused by a time lag between setting of the discovery domain information at the iSNS server and setting of the LUN security at the storage controller.

BRIEF DESCRIPTION OF THE DRAWINGS

FIG. 4 shows a device list table.

FIG. 5 shows an example of a discovery domain list table.

FIGS. 8(1)-(6) shows a group of control tables that are registered in a shared memory in the storage controller.

FIGS. 11(1) and (2) each shows examples of discovery domain information transmitted from an initiator to a target.

FIG. 12 is an example of a target network information table according to another embodiment of the present invention.

FIG. 13 is an example of other control tables that correspond to the target network information in FIG. 12.

DETAILED DESCRIPTION OF THE INVENTION

Figure 1:
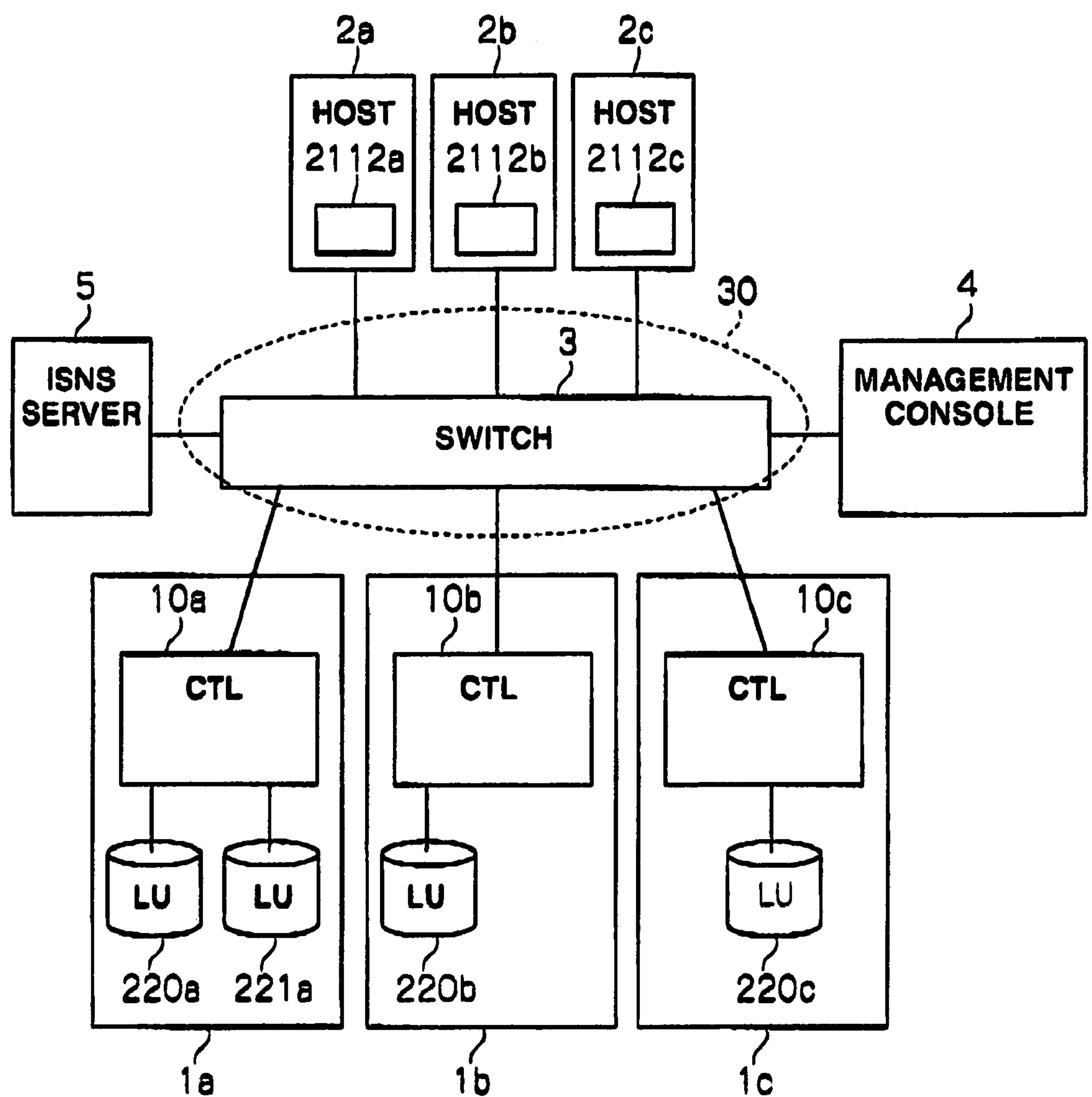
FIG. 1 is a functional block diagram indicating the structure of a storage control system.

An embodiment of the present invention is explained below. The embodiment is merely an example and does not limit the scope of the present invention. FIG. 1 is a functional block diagram of a structure of a storage control system.

The storage control system has: a plurality of storage controllers 1 (a to c); a plurality of host computers 2 (a to c) as host systems; an Internet protocol communication network 30; a switch for connecting a plurality of network nodes to the communication network 30; a management console 4; and an iSNS server for managing identification information for the storage controllers 1 and the host computers 2 as well as the logical connection relationships therebetween. Incidentally, a network node is equipment connected to the network 30, such as the storage controllers 1, host computers 2, management console 4, the iSNS server 5 and the like. The management console 4 is for managing a storage system composed of a plurality of storage apparatuses. The management console 4 can manage the individual storage controllers. The management console 4 may be provided in each storage controller. The network 30, indicated by the elliptical dotted line for convenience, is a collective term used to refer to the switch 3 and a connection line for connecting the storage controllers 1, host computers 2 and the server 5 to the switch 3.

Each of the storage controllers 1 (a to c) control an internally-provided disk storage apparatus and has a controller CTL10 (a to c) for servicing access requests from the host computers 2, and a logical unit LU (220*a*, 220*b*, 220*c* and 221*a*) accessed by the host computers 2.

Each host computer 2 is a computer having a CPU, memory and a network controller for connection to the network 30. In the memory, it has a table 2112 (a to c) for managing initiators.

FIG. 1 shows the system where the plural host computers and storage controllers are connected to an IP network. Because the iSNS server 5 manages access units in host computers and storage computers using names (iSCSI names), an access unit in a host computer can be connected to a permitted access unit in a storage controller. An access unit in a host controller is an access source relative to an access unit in a storage controller; therefore, it represents an initiator. Accordingly, an access unit in a storage controller represents a target.

Figure 2:
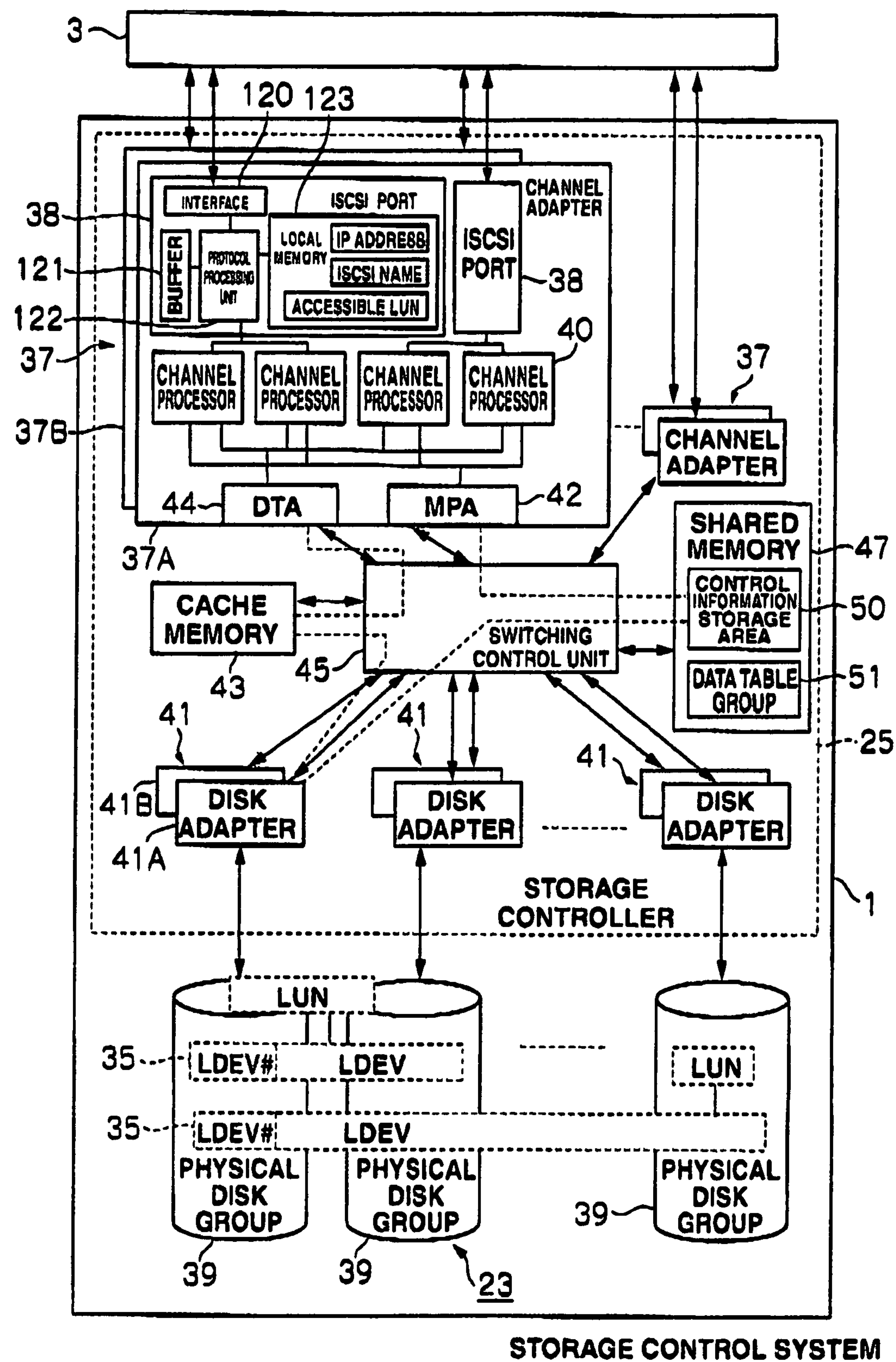
FIG. 2 is a block diagram indicating the hardware structure of a storage controller.

A storage controller 1 is explained in detail below. FIG. 2 is a block diagram indicating the hardware structure of the storage controller 1. The storage controller 1 is, for example, a RAID (Redundant Array of Independent Inexpensive Disks) system and has one or more physical disk groups 39 as storage apparatuses, each group including a plurality of disk-shaped storage apparatuses arranged in arrays. The physical disk groups 39 provide physical storage areas to which one or more logical devices (hereinafter called "LDEV(s)") 35, that is, logical storage areas are set. Each LDEV 35 is assigned with LDEV identification information (hereinafter called the "LDEV#") and corresponds to a logical unit which can be specified by a host computer 2. Logical units are managed according to numbers, which are hereinafter referred to as the "Logical Unit Numbers (LUNs)".

The storage controller 1 has one or more channel adapter sets 37, cache memory 43, shared memory 47, one or more disk adapter sets 41, and a switching control unit 45.

Each channel adapter set 37 includes plural (typically two) channel adapters (37A, 37B) having substantially the same structure. Accordingly, even if a host computer 2 cannot access a predetermined LDEV via the channel adapter 37A, it can still access the LDEV via the other channel adapter 37B. The same structure is applied to the disk adapter sets 41. The disk adapters 41A and 41B have substantially the same structure.

The channel adapter 37A has one or more (two, for example) iSCSI ports 38 via which the channel adapter 37A is connected to one or more host computers 2. It may be composed of a hardware circuit, software, or combination thereof and executes data communication between storage controllers 1 and host computers 2. An iSCSI port 38 is equipped with an interface 120, buffer 121, local memory 123, and a protocol processor 122.

The interface 120 has a cable socket, which is physically connected to the switch 3. The buffer 121 is a memory where data transmitted between host computers 2 and storage controllers 1 is temporarily stored, The local memory 123 is, for example, a non-volatile memory and stores IP addresses, iSCSI names, and LUNs of logical units the iSCSI port 38 can access. The protocol processor 122 is connected to channel processors 40 via a predetermined internal bus (for example, PCI bus) so that they can communicate with each other, and executes protocol processing according to the iSCSI protocol based on the information in the buffer 121 and the local memory 123. Incidentally, a channel processor 40 may have the function of executing the protocol processing instead of protocol processor 122.

The channel adapter 37A is also equipped with one or more micro processors (hereinafter called the "channel processors"), which are connected to the respective iSCSI ports 38 to enable communication. Moreover, it is equipped with a micro processor adapter (hereinafter abbreviated as the "MPA") 42, which is connected to the shared memory 47 to enable communication; and a data transfer adapter (hereinafter abbreviated as the "DTA"), which is connected to the cache memory 43 to enable communication. Transmission of control information (for example, messages between processors) between channel processors 40 and external processors (specifically, micro processors in the disk adapter 41A and 41B, not shown in the drawing) is conducted through the MPA 42.

When write data is written from a host computer 2 to an LDEV 35, or when read data, read from an LDEV 35, is output from the storage controller 1 to a host computer 2, the write data and the read data pass through the DTA 44.

Each channel processor 40, for example, executes polling of a control information storage area 50 in the shared memory 47 to obtain control information via the MPA 42, transmits read data stored in the cache memory 43 to a host computer 2, and stores write target data (write data) received from a host computer 2 in the cache memory 43.

The cache memory 43 is a volatile or non-volatile memory. It temporarily stores write data sent from a channel adapter 37A or 37B to a disk adapter 41A or 41B in a disk adapter set 41; and reed data sent from the disk adapter 41A or 41B to the channel adapter 37A or 37B.

The shared memory 47 is a non-volatile memory and includes a control information storage area 50 and a data table group 51. The control information storage area 50 stores the control information as described above.

A disk adapter set 41 is provided for each physical disk group 39. Each of the disk adapters (41A, 41B) has one or more micro processors (not shown in the drawing) that execute processing to read or write data from or to an LDEV 35 having LDEV# corresponding to a LUN specified by a host computer 2.

The switching control unit 45 may be structured as a high-speed bus, such as a high-speed crossbar switch that executes data transmission by high-speed switching. The switching control unit 45 connects the channel adapters 37A and 37B, the disk adapters 41A and 41B, the shared memory 47 and the cache memory 43 to one another to enable communication therebetween. Accordingly, transmission of data and commands between them is conducted via the switching control unit 45.

When a storage controller 1 receives an I/O request from a host computer 2, it executes processing according to the content of the I/O request. The outline of the processing flow for the I/O request is explained below taking as an example a case where a host computer 2 issues an I/O request. If the I/O request is a read request, the following processing is conducted:

The I/O request, issued by the host computer 2, is stored in the buffer 121 in the iSCSI port 38. The relevant channel processor 40 reads the I/O request from the buffer 121 and judges whether the data (read data) requested to be read by the I/O request exists in the cache memory 43.

If the judgment result is positive, that is, if the read data exits in the cache memory 43 (cache hit), the relevant channel processor 40 obtains the read data via the DTA 44 from the cache memory 43 and transmits it to the host apparatus 2 via the iSCSI port 38.

Whereas, if the judgment result is negative, that is, if the read data does not exist in the cache memory 43 (cache miss), the relevant channel processor 40 stores in the shared memory 47, via the MPA 42, control information for instructing the micro processor (hereinafter called the "disk processor") in the relevant disk adapter 41A to read the read data in a predetermined LDEV 35 out to the cache memory 43. When the relevant disk processor reads the control information, the read data is read from the predetermined LDEV 35 and stored in the cache memory 43. The relevant channel processor 40 then obtains the read data from the cache memory 43 and transmits it to the host apparatus 2.

Meanwhile, the following processing is conducted if the I/O request is a write request. An I/O request including write data output from a host computer 2 is stored in the buffer 121 in the iSCSI port 38. The relevant channel processor 40 reads the I/O request from the buffer 121 and judges whether the write data already exists in a predetermined area (hereinafter called the "predetermined cache slot") in the cache memory 43.

If the judgment result is positive, that is, if the write data exists in a predetermined cache slot (cache hit), the relevant channel processor 40 overwrites the write data in the predetermined cache slot with the write data included in the read I/O request.

Whereas, if the judgment result is negative, that is, if the write data does not exist in the predetermined cache slot (cache miss), the relevant channel processor 40 instructs the drive control unit 107 to read the write data from an LDEV specified in the I/O request out to the cache memory 43. Then, when the disk adapter 41A reads the write data from the data storage area and stores it in the predetermined cache slot, the relevant channel processor 40 overwrites the data stored in the predetermined cache slot with the write data included in the I/O request.

When the write data is written in the cache memory 43 as above, a completion report is sent from the storage controller 1 to the host computer 2, assuming that the write request has been completed. Incidentally, at the time when the write data is written in the cache memory 43, the data normally is not reflected in a predetermined LDEV 35 but the relevant disk processor later reads the write data from the cache memory 43 and writes it in the predetermined LDEV.

Figure 3:
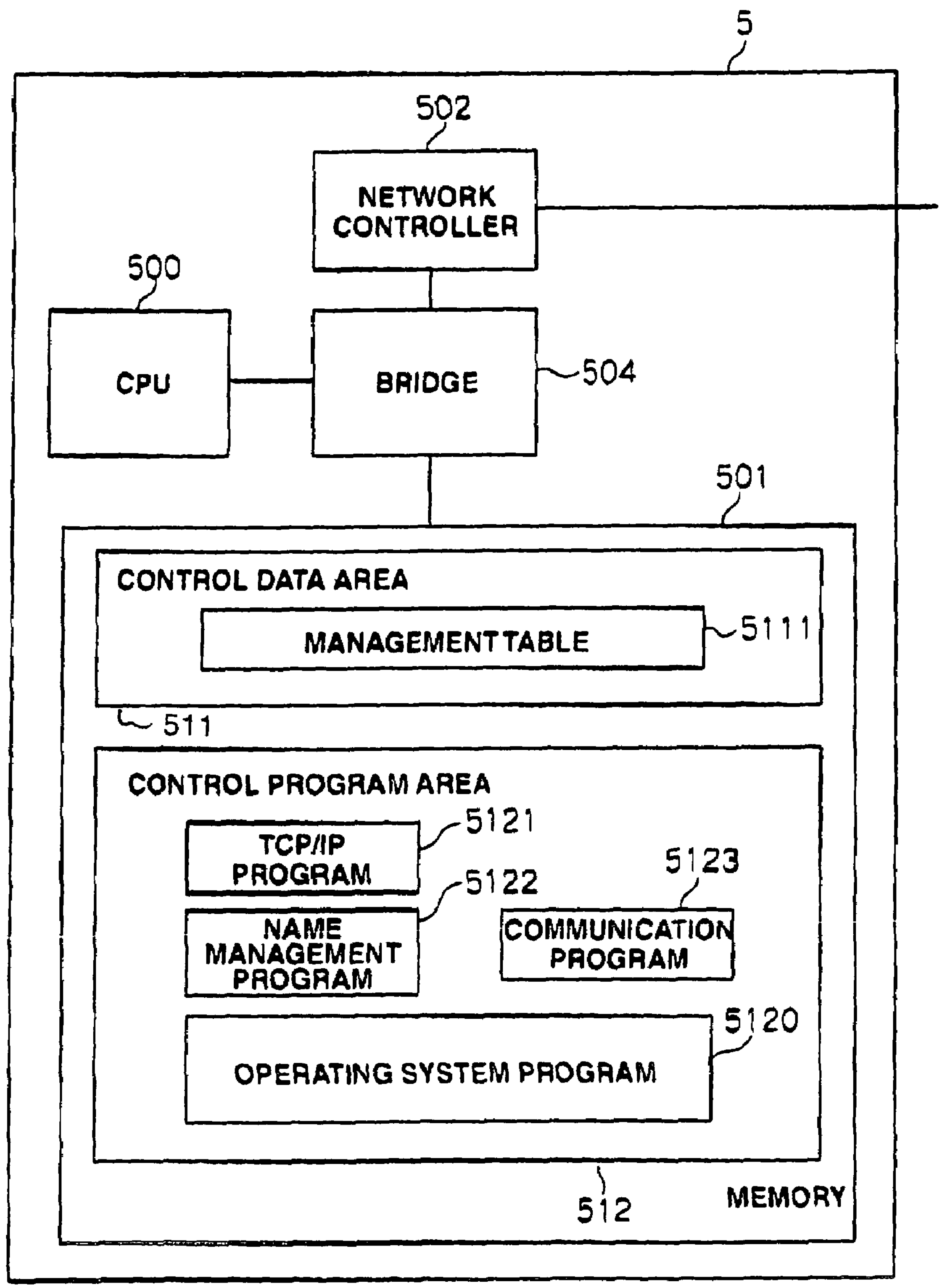
FIG. 3 is a functional block diagram indicating an iSNS server.

FIG. 3 shows an example of the structure of the iSNS server 5. The iSNS server 5 has: a CPU 500 for controlling its entirety; a memory 501 for storing control data and control programs executed by the CPU 500; a network controller 502 for connection to the network 30; and a bridge 504 for controlling transfer of data and programs between the CPU 500 and the memory 501 as well as transfer of data between the network controller 502 and the memory 501. The memory 501 includes a control data area 511 and a control program area 512.

The control data area 511 is an area for storing various tables the CPU 500 refers to when executing control programs. It stores names (iSCSI names) of initiators and targets in iSCSI; and a management table 5111 where the connection relationships (discovery domain information) between the initiators and the targets are stored.

The control program area 512 is an area for storing control programs executed by the CPU 500. It stores: an operating system program 5120 which is a basic program creating the environment for executing the control programs; a TCP/IP program 5121 for executing network 30—using data transmission using TCP/IP protocol; a name management program 5122 for managing the names of iSCSI nodes (i.e., host computers 2 and storage controllers 1) connected to the network 30 as well as controlling correspondence relationships between iSCSI initiators and iSCSI targets; and a communication program 5123 for conducting communication for managing the names of the respective initiators and targets based on the iSCSI protocol specification. Instead of using iSNS server (iSCSI Name Server) 5, name server specifications other than iSNS may be used.

Device information for initiator(s) in a host computer 2 and target(s) in the storage controller 1, that are clients on the name server 5, is registered in the management table 5111 (FIG. 3) in the server. FIG. 4 shows an example of a device list table. In the device list table, control information including device names (iSCSI names) of devices (initiators and targets), IP addresses and device TCP port numbers, types (initiator/target), with or without entity state inquiry (ESI), and state change notification (SCN) is registered. In FIG. 4, AAAAA is an iSCSI name of an initiator A at a host computer 2 and BBBBB is an iSCSI name of a target B at a storage controller 1. A domain bit map is a flag which indicates whether or not the relevant device is registered in a discovery domain list table shown in FIG. 8(6), which will be described later. A "control" is a flag indicating whether or not the iSNS server has management authority over the relevant device.

Figure 6:
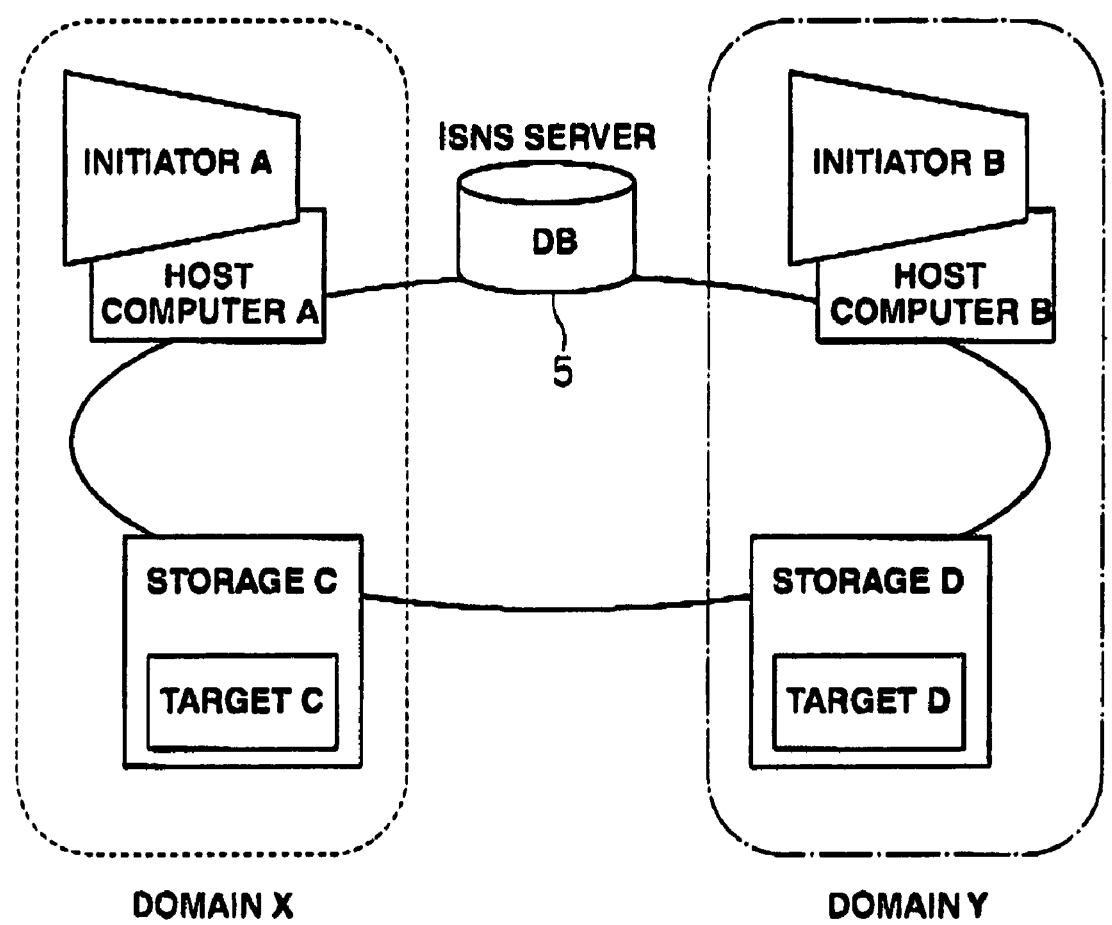
FIG. 6 shows an example of discovery domain configurations.

A discovery domain list table is also stored, as the management table 5111, in the control data area in the server. Discovery domain information refers to information defining the connection relationship between initiator(s) and target(s). FIG. 5 shows an example of a discovery domain list table, in which, an initiator A at a host computer A and a target C at a storage controller C are allocated to a group called domain X and an initiator B at a host computer B and a target D at a storage controller D are allocated to a group called domain Y. This structure is illustrated in FIG. 6. The initiator A is allowed to be connected to the target C in the same domain (group) but not to the target D in the different domain (group). The initiator 8 is allowed to be connected to the target D.

When the host computer A transmits a request for 'discovery', processing to search for a connection target, to the iSNS server, the iSNS server refers to the discovery domain list table and the device table and notifies the host computer A of the IP address and iSCSI name of the target C, which is to be connected to the initiator A.

If SCN is registered in the target list table shown in FIG. 4, and if the target C has just been registered at the iSNS server as a new discovery domain, or if there has been any change made in the domain group the target C belongs to, the nodes (initiators and targets) belonging to the same domain group are notified of the registration content of the discovery domain. Accordingly, an initiator at the host computer can know the names and addresses of accessible targets. The same can be said about targets. The initiator therefore can access the targets defined as belonging to the same domain group based on the iSCSI names.

The device list table shown in FIG. 4 is registered in the control data area in the iSNS server when an initiator or a target accesses the iSNS server. The discovery domain list table is created by an iSNS server administrator. Specifically, the discovery domain list table is created and registered based on information on a property created by the administrator using a user interface (for example, a GUI).

Figure 7:
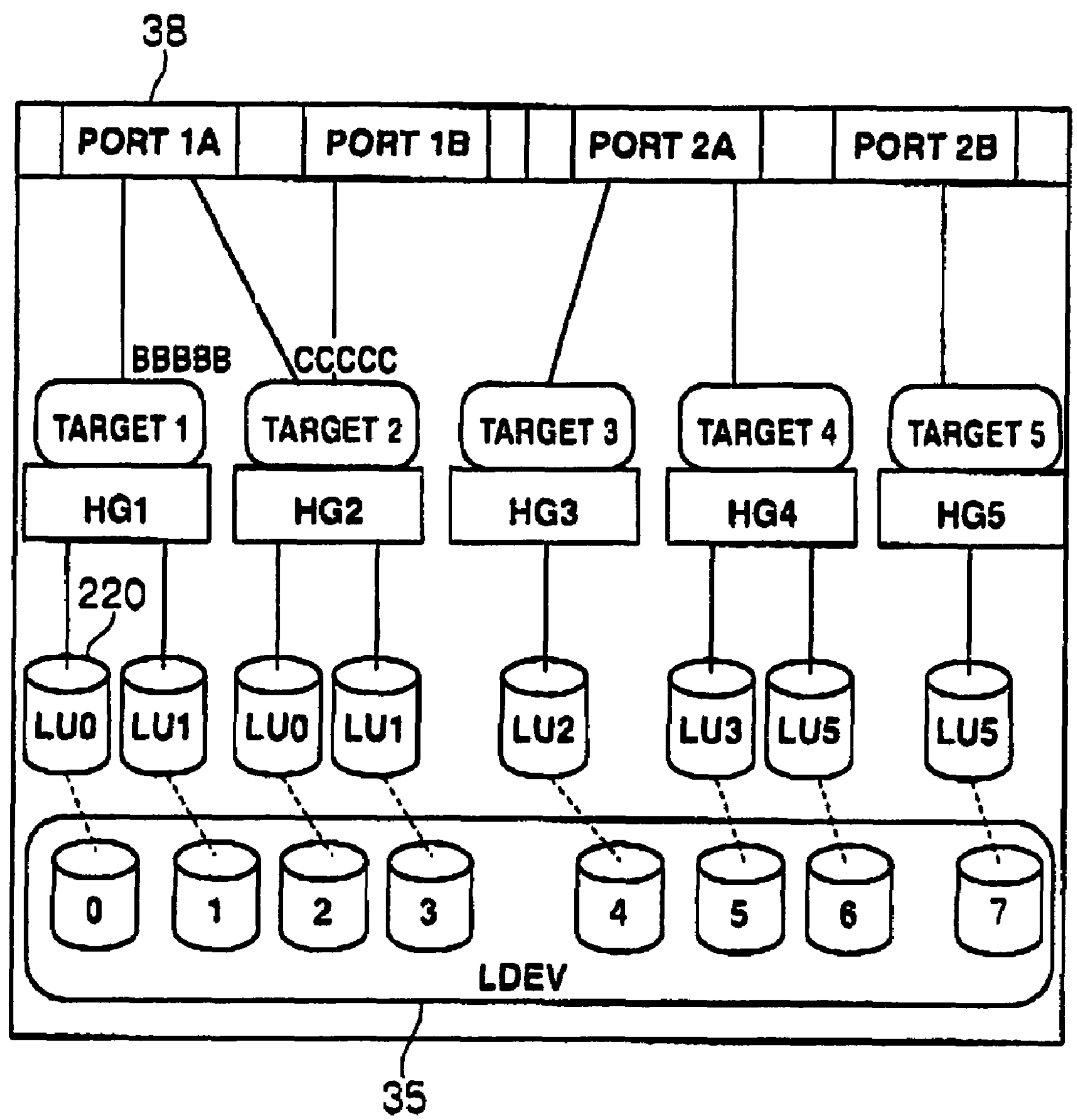
FIG. 7 is a functional block diagram illustrating LUN security set inside the storage controller.

LUN security for a storage controller is explained below. FIG. 7 is a functional block diagram illustrating the LUN security set for the storage controller. In this figure, ports 3B (1A, 1B, 2A and 2B) are respectively assigned predetermined targets (1 to 5). A host group (HG) (1 to 5) is a management unit for defining correspondence relationships between a targets and LUs 220. A host group corresponds to specified logical unit(s). In one example, a port 2A is mapped onto a target 3 (HG3) and a target 4 (HG4). The target 3 is assigned a logical unit LU2. The target 4 is assigned logical units LU3 and LU 5.

The LUN security is realized by various control tables set in the control information storage area 50 in the shared memory 47 in the storage controller. FIG. 8(1) is a target network information table, in which network information (IP address/TCP port #, iSNS server address) for ports, to which targets belong, is defined.

FIG. 8(2) is a target list table. In the storage controller, targets are set as host groups (HG) so that they are related to initiators, which are allowed to access the targets. In the table, one host group corresponds to one iSCSI name of a target iSCSI name. A port the target belongs to is also defined in the table. According to FIG. 7 and the table in FIG. 8(2), a port 1A is mapped onto host groups HG#1 and HG#2 so that the target BBBBB and the target CCCCC can be seen from the port 1A. Incidentally, in FIG. 8(2), "00" in the section DD indicates that a host group has not been set yet.

FIG. 8(3) shows an initiator list table. An initiator is given permission to access target(s) when a corresponding host group bit map is set in the table. For example, for the initiator AAAAA, a host group bit map is set to enable access to the target BBBBB (HG#1) and the target CCCCC (HG#2), both targets being mapped to the port 1A. FIG. 8(4) shows an access list table. Each host group is assigned logical unit number(s) (LUNs) of accessible logical unit(s). Incidentally, AAAAA, BBBBB and CCCCC are iSCSI names of initiators and targets.

Initiator access to a specified target is explained below in detail. For example, when the initiator AAAAA logs into the target BBBBB, the target BBBBB stores, in an iSCSI name network connection conversion table, an iSCSI name and its connection information, that is, an IP address and a TCP port number, included in the login command. FIG. 8(5) shows the conversion table. After the login, the storage controller identifies initiators based on this conversion table. Host group information (HG#) in the conversion table is obtained by referring to the initiator list table FIG. 8(3).

Specifically, a channel processor 40 in a channel adapter connected to a storage controller port refers to the initiator list table and if it finds that the iSCSI name of the current initiator is registered in the initiator list table, it responds "login accepted" to the initiator. Whereas, if the iSCSI name is not registered in the table, it responds "login rejected" to the initiator. At this time, the initiator iSCSI name network connection conversion table is created by the storage controller. Regarding post-login SCSI commands from the initiator, the storage controller deals with them based on the corresponding device (LUN) information in the access list table.

When the initiator succeeded the "Login" in the target, the storage controller can specify the iSCSI name of the initiator, thereby specifying a host group for the initiator in the initiator list table, and thereby specifying logical unit(s) (LUs) allocated to the host group by referring to the access list table in which the host group is registered. Incidentally, in the access list table, one host group may also correspond to one logical unit (LU).

Figure 9:
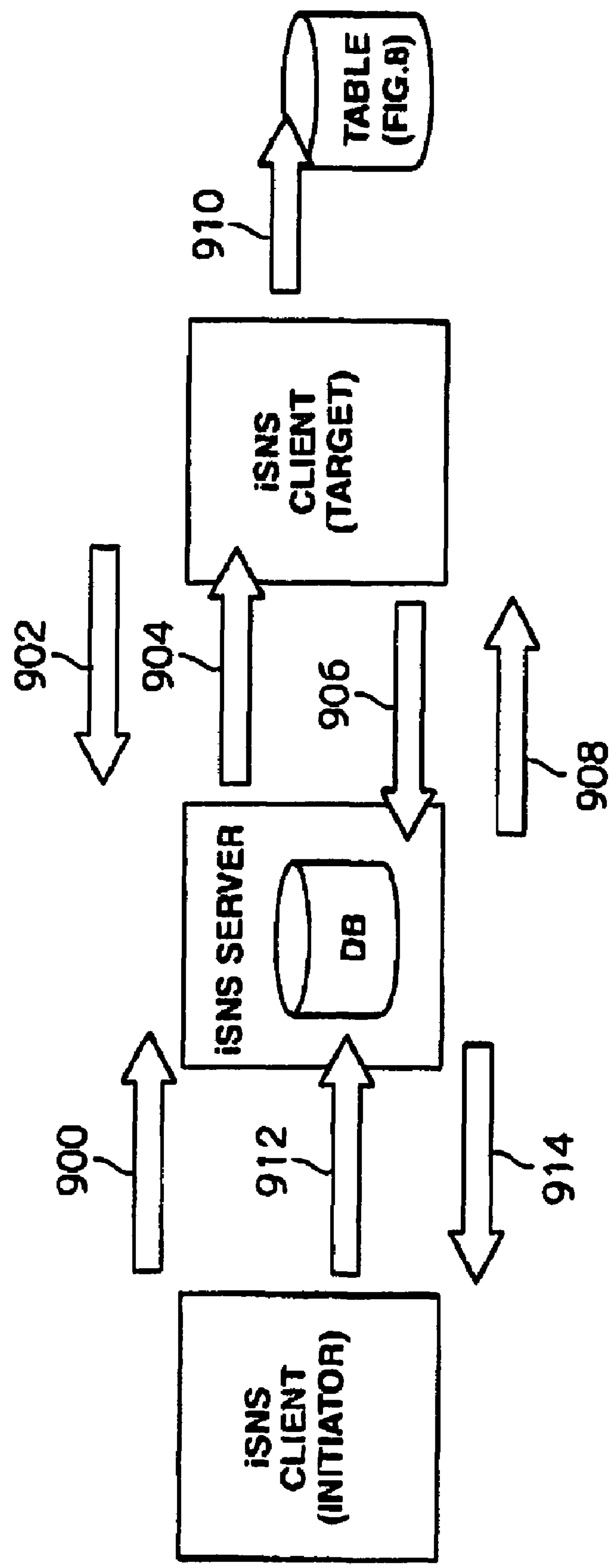
FIG. 9 is a timing chart illustrating the storage controller's operation to set LUN security based on information from the iSNS server.

Automatic LUN security setting executed by the storage controller based on discovery domain configuration change information is explained in detail below using a flow chart and a timing flow chart. The discovery domain configuration change information is information the iSNS server notifies the storage controller when the aforementioned discovery domain setting is conducted on the iSNS server. FIG. 9 shows the timing chart and FIG. 10 shows the flow chart.

Figure 10:
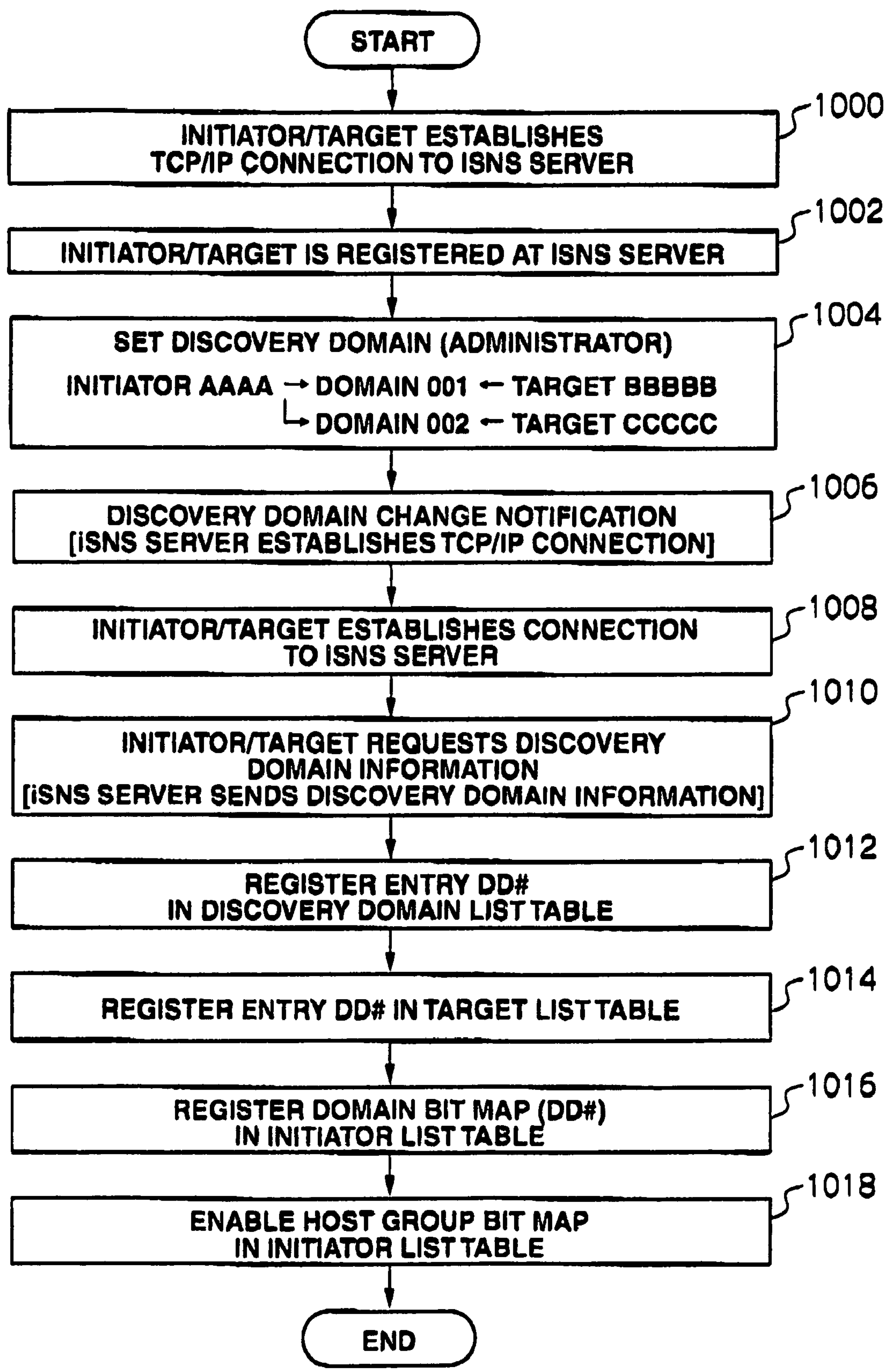
FIG. 10 is a flow chart indicating the storage controller's operation to set LUN security based on the information from the iSNS server.

First, as shown in step 1000 in FIG. 10, a host computer (initiator) and a storage controller (targets) establish TCP/IP connection to the iSNS server and the iSCSI name AAAAA of the initiator and the iSCSI names BBBBB and CCCCC of the targets are registered in the device list table (FIG. 4) in the iSNS server (step 1002). These steps correspond to 900 and 902 in FIG. 9. Other parameters are also registered in the device list table in the iSNS server. By setting "Yes (notify)" in the SCN section in the device list table, when any change is made in the discovery domain relative to the server, post-change discovery domain information is sent to the targets.

In stop 1004, the administrator of the iSNS server sets discovery domains. Specifically, the initiator AAAAA is registered as belonging to domains 001 and 002, the target BBBBB is registered as belonging to domain 001, and the target CCCCC is registered as belonging to domain 002.

In step 1006, the iSNS server establishes connections to the respective nodes, each of which has SCN registered in the device list table, and notifies the initiator AAAAA and the targets BBBBB and CCCCC of discovery domain change (904 in FIG. 9). In step 1008, the initiator and the targets establish TCP/IP connection with the iSNS server and issue SCN commands to the relevant initiator and target(s). In step 1010, the initiator and target(s) that received the SCN commands request discovery domain information from the iSNS server (906 in FIG. 9). The iSNS server then transmits the requested discovery domain information to the initiator and target(s) (908 in FIG. 9). After that, the connection is terminated.

Then, the storage controller 1 has the information from the iSNS server reflected in the control table group shown in FIG. 8 (910 in FIG. 9). FIG. 11(1) shows the discovery domain information sent to the target BBBBB and (2) shows the discovery domain information sent to the target CCCCC. The initiator AAAAA receives the both pieces of information shown in FIGS. 11(1) and (2).

The storage controller 1 updates the initiator list table (FIG. 8(3)) based on the discovery domain information received by the targets. First, it registers domain names in the discovery domain list table shown in FIG. 8(6) and defines entry # (DD) for each of the domain names (stop 1012), entry # (DD) being management units in classification for initiators and targets. Incidentally, the initiator list table (3), the initiator name network conversion table (5), and the discovery domain list table (6) in FIG. 8 are created by a processor (channel processor) in the storage controller 1 based on the information the storage controller 1 obtained from the iSNS server; and registered in the shared memory 47.

The storage controller 1 registers an entry # for each target that belongs to a domain name based on the discovery domain information. Specifically, DD # (01) is registered for the target BBBBB and DD # (02) is registered to for the target CCCCC in the target list table in FIG. 8(2) (step 1014). Based on the discovery domain information, the storage controller 1 then registers, in the initiator list table (FIG. 8(3)), a domain bit map for the initiators belonging to the domain names in such a manner that the domain bit map corresponds to the entry # of the targets allocated to the domain name (step 1016).

Subsequently, the storage controller 1 identifies host groups that correspond to the specified entry # (DD#) in the target list table (FIG. 8(2)) and enables a host group bit map of the initiator in the initiator list table (FIG. 8(3)) so that the host group bit map corresponds to the host groups (step 1018). Specifically, as indicated in the initiator list table FIG. 8(3), the storage controller 1 enables the host group bit map of the initiator AAAAA so that the initiator AAAAA corresponds to the host groups of the targets BBBBB and CCCCC. Bit 1 in a host group bit map corresponds to a host group 00, bit 2 corresponds to a host group 01, bit 3 corresponds to a host group 02, . . . and the final bit corresponds to a host group FF. Specifically, if the host group bit map is registered as 0110000 . . . 0000, the initiator AAAAA corresponds to the targets BBBBB and CCCCC. Therefore the initiator AAAAA can access only the target BBBBB (host group: 01) and the target CCCCC (host group: 02), both for which LUN security is set. As explained, the LUN security for the targets is set, as the target list table and the access list table, by the management console prior to the iSNS registration.

When the iSNS server transmits to the storage controller 1 the access setting information, which is the information about access settings made in the iSNS server regarding accesses between the host computer and the storage controller 1, the storage controller 1 receives the access setting information, analyzes it, and uses the information when limiting and controlling access from the host computer to the storage resources. Thereby, access control by the iSNS server and that by the storage controller can be integrated. This enables automation and integration of LUN security settings, which is different from just setting LUN security at the management console (management server) 4 show in FIG. 1. As shown in FIG. 9, when the initiator transmits a target information discovery request to the iSNS server (912 in FIG. 9), the iSNS server notifies the initiator of the specified target's iSCSI name and IP address and the like (912 in FIG. 9). Based on this notification, the initiator accesses the intended target for which LUN security is set.

The iSNS server may be provided in the storage controller. Specifically, the channel processors in the storage controller may deal with targets and initiators that access a predetermined port as the iSNS server's clients and centrally manage iSNS requests from the initiators and the targets together with the access setting information in the storage controller. If an access target is a target inside the storage controller, the relevant channel processor need not involve the network, but only access the shared memory having the access setting information in order to access the internal iSNS server. Incidentally, targets include targets in the storage controller itself as well as those in other storage controllers. In the present case where the iSNS server is provided in the storage controller, the previous external iSNS server may be omitted or may be used together with the internal iSNS server. This configuration is explained below as another embodiment.

FIG. 12 shows a target network information table according to the present embodiment. In this table, the new sections "Server" and "Listen" have been added to the sections in the target network information table according to the previous embodiment. FIG. 13 shows other control tables corresponding to the present target network information table. In the present embodiment, an iSNS server function is connected to the port 2A in the block diagram of FIG. 7.

In the target network information table in FIG. 12, "Enable" in the "Server" section indicates that the iSNS server of the relevant port is enabled. In the table, the IP address of the iSNS server is 192.168.0.220, which is the same IP address as the target in the same storage controller. The TCP port number of the iSNS server is "3205," indicated in the "Listen" section. Therefore, it is possible to judge whether an access to the port 2A is an access to the iSCSI target or an access to the iSNS server. This function is realized by the protocol processor 122 as shown in FIG. 2. Incidentally, the storage controller provides a user I/F for assigning initiators and targets, registered at the iSNS server, to discovery domains.

The iSNS server function accepts registration from other storage controllers (targets) and host computers (initiators). Accordingly, the iSNS server needs tables having information to identify initiators and targets that do not exist in the storage controller.

In the target list table, if "00" is written in the "HG#" section, it means that the relevant host group is a device outside the present storage controller. Accordingly, when the iSNS server function receives an iSNS registration request from a target in an external storage controller, that target is registered as belonging to HG#00. In the discovery domain list table, "00" in the "Entry#" section indicates that the relevant host group does not belong to any domain group. This is the same in the previous embodiment. Because there are some cases where initiators and targets first register themselves at the iSNS server and their discovery domains are then determined by the iSNS server, when they register at the iSNS server for the first time, they have the attribute "00". When their discovery domains are then defined in the iSNS server, domain bit maps and target entry # are updated in the initiator list table based on the defined content.

In the access list table, if a target is a target in an external storage controller, in other words, if the present storage controller operates only as the iSNS server, "FF: FF" is written the "CU: LDEV" section. Even when targets in external storage controllers are registered at the iSNS server, the target names are registered in the target list table, therefore, whether or not a registered target is a target managed in the present storage controller or a target managed in another storage controller is determined by what is entered in the "CU: LDEV" section. If the target is the one in the external storage controller, it is not subject to the LUN security.

In case of an external host computer or an external storage controller, an initiator or a target therein establishes TCP connection with the iSNS server at the port 2A and registers at the iSNS server. Information registered includes an IP address/TCP port number and iSCSI name or the like. Then, the initiator or the target is allocated to a discovery domain as instructed via the user I/F (for example, a GUI) provided by the storage controller.

For example, if a port 2B registers at the iSNS server at the port 2A, the same iSNS server address as that for the port A is entered in the "iSNS server address" section in the target network information table. When a target is the port 2B, for example, the target (port 2B) does not have to establish TCP connection to the iSNS server (port 2A) or register at the iSNS server because necessary updates have been already conducted in the respective tables by the storage controller.

Specifically, when setting a target in a storage controller, if the iSNS server IP address for the target (192.168.100.220 for port 2B) matches any iSNS IP address of ports whose "Server" section is set to "Enable" in the target network information table (in the present case, the iSNS server IP address of the port 2A matches that of the port 2B), the target can omit TCP connection establishment and registration at the iSNS server. Moreover, because the respective tables are updated as necessary when making settings in the iSNS server, SCN notification can be omitted. As explained, if a target in a storage controller designates an iSNS server in the same storage controller, it can access the iSNS server without involving the network.

With a storage controller equipped with an iSNS server, a storage controller administrator only needs to make the settings in the iSNS server therein. Accordingly, the administrator can set LUN security without paying attention to it.

We claim:

1. A storage control system comprising:

a host computer having one or more initiators;

a storage controller having one or more targets and storage areas, and also having a security property that defines access relationships between the one or more targets and the storage areas; and a server having a first memory for storing correspondence relationships between the one or more initiators and the one or more targets, and the storage controller having a second memory, wherein the server notifies the host computer and the storage controller of the correspondence relationships, wherein, the host computer, the storage controller and the server are connected to each other via a communication network, wherein the storage controller sets, based on the correspondence relationships received as notification from the server, the security property in such a manner that an initiator can access a specified storage area via a target, the initiator and the target having been notified of the correspondence relationships, wherein the correspondence relationships stored in the first memory comprise:

a domain information table comprising domain information, which comprises domain names and groups of initiators and corresponding targets, wherein the groups of initiators and corresponding targets are allocated to a domain corresponding to a respective domain name; and a device information table comprising device information for the one or more initiators and the one or more targets, wherein the device information table comprises state change notification information indicating whether the server is to notify the one or more initiators and the one or more targets of post-change domain information when any change in the correspondence relationships is registered at the server, and wherein the storage controller receives the post change domain information from the server, registers the post change domain information in the second memory, and establishes correspondence relationships between specified management units and the one or more initiators belonging to the groups of initiators and corresponding targets.

2. A storage control system comprising:

a storage controller;

a host computer; and a server, wherein the server comprises a first memory for storing correspondence relationships between one or more targets in the storage controller and one or more initiators in the host computer, wherein the storage controller, the host computer and the server are connected to each other via a communication network, so as to control access between the one or more initiators and the one or more targets, wherein, the storage controller comprises:

a port for receiving access from the host computer;

a processor for processing information output from the port;

a data storage apparatus for storing write data received from the host computer and/or read data transmitted to the host computer;

a second memory for storing a LUN (logical unit) security property that defines correspondence relationships between the one or more targets and one or more logical units in the data storage apparatus; and an access management list that defines correspondence relationships between the one or more initiators and the one or more targets, and wherein, the processor sets the access management list by referring to the correspondence relationships stored in the first memory, wherein the correspondence relationships stored in the first memory comprise:

a domain information table comprising domain information, which comprises domain names and groups of initiators and corresponding targets, wherein the groups of initiators and corresponding targets are allocated to a domain corresponding to a respective domain name; and a device information table comprising device information for the one or more initiators and the one or more targets, wherein the device information table comprises state change notification information indicating whether the server is to notify the one or more initiators and the one or more targets of post-change domain information when any change in the correspondence relationships is registered at the server, and wherein the storage controller receives the post change domain information from the server, registers the post change domain information in the second memory, and establishes correspondence relationships between specified management units and the one or more initiators belonging to the groups of initiators and corresponding targets.

3. The storage control system according to claim 2, wherein the correspondence relationships stored in the first memory comprises:

identification information for distinguishing the one or more initiators from one another; and identification information for distinguishing the one or more targets from one another, wherein the identification information includes iSCSI (Internet Small Computer System Interface) names based on the iSCSI protocol.

4. The storage control system according to claim 3, wherein the server is configured to notify the one or more initiators and the one or more targets of the correspondence relationships stored in the first memory.

5. The storage control system according to claim 4, wherein when any change in the correspondence relationships is registered at the server, the server notifies the one or more initiators and the one or more targets of the post-change domain information resulting from any change in the correspondence relationships that is registered at the server.

6. The storage control system according to claim 2, further comprising control information, with which, when a new initiator and/or target is registered in the device information table, or, when an already-registered initiator and/or target is deleted from the device information table, the server notifies the relevant initiators and/or targets to that effect.

7. The storage control system according to claim 2, wherein the processor sets the access in such a manner that an initiator is connected to a specified target for which LUN security is set.

8. The storage control system according to claim 2, wherein the storage controller provides, between ports and logical units, management units that correspond to the one or more targets and registers the correspondence relationships between the management units and the one or more targets, as well as the correspondence relationships between the management units and the logical units as the LUN security property in the second memory.

9. The storage control system according to claim 8, wherein the correspondence relationships stored in the first memory include identification information for distinguishing the one or more initiators from one another, and identification information for distinguishing the plural one or more targets from one another.

10. The storage control system according to claim 2, wherein the server is provided in the storage controller.

11. The storage control system according to claim 10, wherein the server can be accessed from a target in the storage controller as well as a target in a different storage controller.

12. A storage controller connected via a communication network to a host computer having one or more initiators and to a server having a first memory for storing correspondence relationships between initiators and targets, wherein the server notifies the host computer and the storage controller of the correspondence relationships, the storage controller comprising:

a second memory;

one or more targets;

one or more storage areas; and a security property that defines access relationships between the one or more targets and the storage areas, wherein, the security property is set, based on the correspondence relationship received as notification from the server, in such a manner that an initiator can access a specified storage area via a target, the initiator and the target having been notified of the correspondence relationships, wherein the correspondence relationships stored in the first memory comprise:

a domain information table comprising domain information, which comprises domain names and groups of initiators and corresponding targets, wherein the groups of initiators and corresponding targets are allocated to a domain corresponding to a respective domain name; and a device information table comprising device information for the one or more initiators and the one or more the targets, wherein the device information table comprises state change notification information indicating whether the server is to notify the one or more initiators and the one or more targets of post-change domain information when any change in the correspondence relationships is registered at the server, and wherein the storage controller receives the post change domain information from the server, registers the post change domain information in the second memory, and establishes correspondence relationships between specified management units and the one or more initiators belonging to the groups of initiators and corresponding targets.

* * * * *